UNITED STATES PATENT OFFICE.

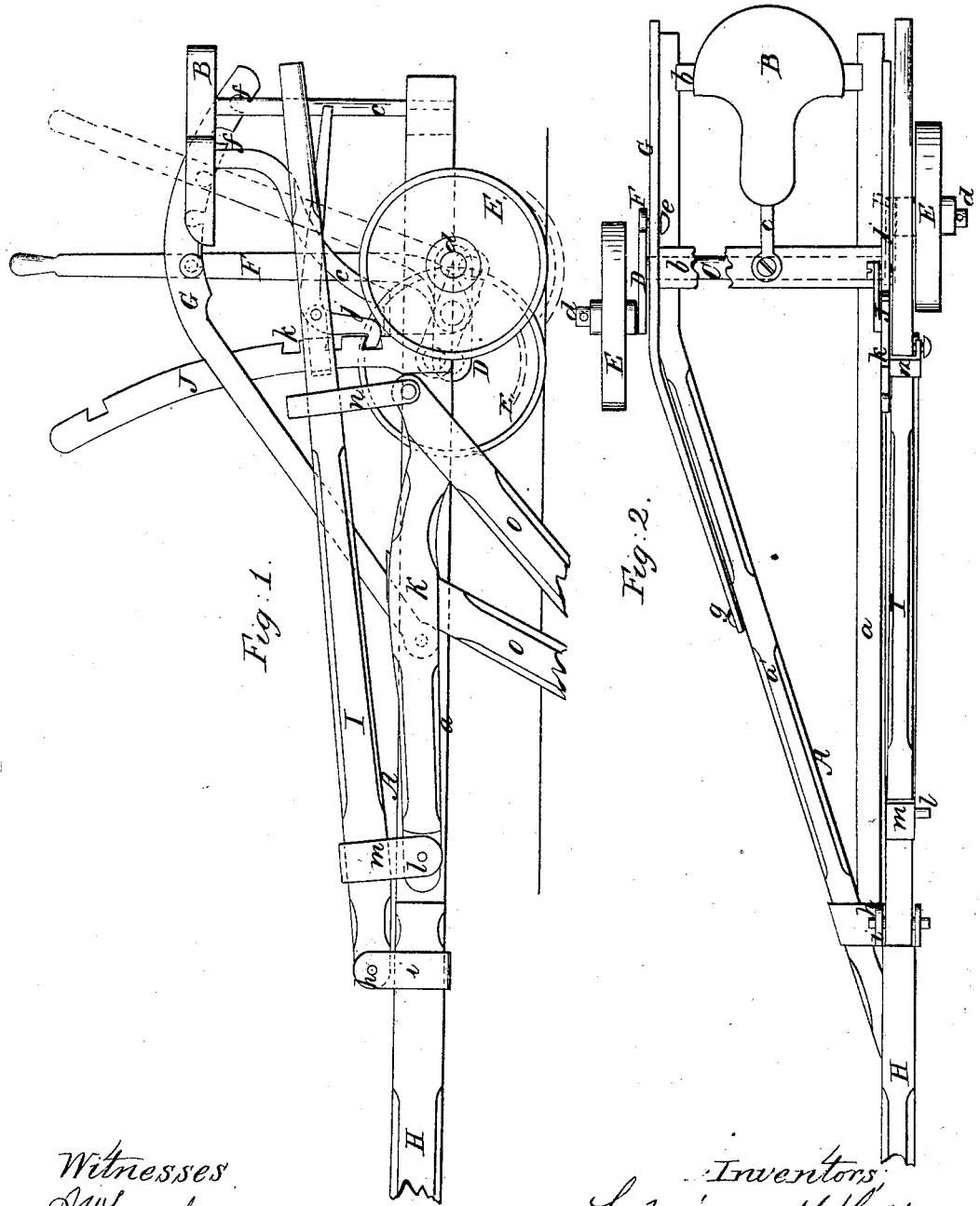

LEANDER MILLER AND HERMANN KALLER, OF CAMP POINT, ILLINOIS.

IMPROVEMENT IN PLOWS.

Specification forming part of Letters Patent No. 45,427, dated December 13, 1864; antedated January 10, 1863.

*To all whom it may concern:*

Be it known that we, L. MILLER and H. KALLER, both of Camp Point, in the county of Adams and State of Illinois, have invented a new and Improved Plow; and we do hereby declare that the following is a full, clear, and exact description of the same, reference being had to the accompanying drawings, making a part of this specification, in which—

Figure 1 is a side view of our invention. Fig. 2 is a plan or top view of the same.

Similar letters of reference indicate corresponding parts in the two figures.

The object of this invention is to obtain a plow of simple construction, which will be free from side draft, capable of being adjusted so as to regulate the pitch of the share as may be desired, and also to elevate it entirely above the surface of the ground, when necessary, and also capable of having the wheels on which the frame is mounted adjustable, so that the implement may be kept in a proper horizontal position when at work with one wheel in the furrow and the other on the unplowed land, or when both wheels are moving over level or unbroken ground.

To enable those skilled in the art to fully understand and construct our invention, we will proceed to describe it.

A represents the frame of the device, which is composed of two bars, $a$ $a'$, connected together at their front ends and obliquely with each other, as shown in Fig. 2. The bars $a$ $a'$ are connected by cross-pieces $b$ $b$, to which the seat-standards $c$ are attached, the seat B being over the back part of the frame A.

C is the axle of the frame A, provided at each end with a crank, D. These cranks have opposite positions—that is to say, they project from the axle from opposite sides—and each crank has an arm, $d$, projecting from it at right angles. The wheels E, which are of equal diameter, are placed on these arms $d$. The axle C is allowed to turn freely in bearings connected with the frame A, the wheels E turning freely on the arms $d$. To one of the cranks D a lever, F, is attached, said lever extending upward at the right-hand side of the frame A, and having a pin, $e$, projecting from it to fit into any of a series of notches, $f$, made in a bar, G, the front end of which is attached to the bar $a'$ of the frame A by a pivot-bolt, $g$. This notched bar G serves as a stop to the lever F, and retains it and the axle C at different points in the scope of their movement.

H is the draft-pole, which is connected to and is in line with the bar $a$ of the frame A, and I is a bar, the front end of which is secured by a pivot-bolt, $h$, in a clip, $i$, on the bar $a$. At the back part of the bar I there is attached a bent bar, $j$, which may be fitted in any of a series of notches, $k$, in a curved or segment bar, J, attached to the bar $h$ of the frame A, the bar $j$ serving as a catch to secure the bar I at different heights. This will be fully understood by referring to Fig. 1.

K is a plow-beam, the front end of which is secured by a pivot-bolt, $l$, in a clip, $m$, on the front part of the bar I, and the back part of the beam is connected to the bar I by a link, $n$, which is fitted loosely on bar I, and has sufficient play thereon to admit of a wedge being inserted within it, above the beam, for the purpose of regulating the position of the latter with bar I and adjusting the plow at a greater or less inclination, as circumstances may require. The beam K has two standards, $o$ $o$, attached to it, to which the plow (not represented) is secured in the usual way.

The operation is as follows: When the plow is at work the left-hand wheel E runs in the furrow and the axle C is so turned or adjusted that said wheel will be lower than its fellow at the opposite side of the frame A, and thereby compensate for the variation in the height of the two surfaces over which the wheels pass, and when the plow is not at work, and being drawn from place to place over unbroken ground, the two wheels are adjusted to a level or to the same height, the axle and wheels being retained in the desired position by the means previously specified—to wit, the lever F and notched bar G. The plow is elevated entirely above the ground, when desired, by raising the back end of the bar I and securing it by fitting the catch $j$ in the notched segment-bar J. In consequence of the line of draft being in the same plane with the plow-beam K there is no side draft to contend with, and the lever F and bar I are both within reach of the driver on seat B. The downward tendency of the plow as the device is drawn along is compensated for by the weight of the driver on seat B, and the draft is thereby rendered lighter or easier than it otherwise would be.

Having thus described our invention, what we claim as new, and desire to secure by Letters Patent, is—

1. The axle C, provided with the cranks D D, having the wheels E E attached, in connection with the lever F and stop-bar G, all arranged as and for the purpose herein set forth.

2. The bar I, attached to the bar a of the frame A, as shown, and secured at the desired height by the catch j and notched segment-bar J, in connection with the adjustable plow-beam K, attached to the bar I, substantially as and for the purpose herein set forth.

3. The combination of the adjustable beam K, bar I, and adjustable axle C, all arranged as and for the purpose specified.

LEANDER MILLER.
HERMANN KALLER.

Witnesses:
JAMES ROBERTSON,
JAMES McCORMICK.